United States Patent
Nagai et al.

(10) Patent No.: US 12,360,328 B2
(45) Date of Patent: Jul. 15, 2025

(54) OPTICAL FIBER RIBBON AND METHOD FOR PRODUCING OPTICAL FIBER RIBBON

(71) Applicant: SWCC Corporation, Kawasaki (JP)

(72) Inventors: Takeshiro Nagai, Kawasaki (JP);
Takehiko Yamamoto, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 0 days.

(21) Appl. No.: 18/291,713

(22) PCT Filed: Nov. 30, 2023

(86) PCT No.: PCT/JP2023/042927
§ 371 (c)(1),
(2) Date: Sep. 23, 2024

(87) PCT Pub. No.: WO2025/115181
PCT Pub. Date: May 6, 2025

(65) Prior Publication Data
US 2025/0180847 A1    Jun. 5, 2025

(51) Int. Cl.
*G02B 6/44* (2006.01)

(52) U.S. Cl.
CPC ............ *G02B 6/448* (2013.01); *G02B 6/4482* (2013.01)

(58) Field of Classification Search
CPC .............................. G02B 6/448; G02B 6/4482
USPC .......................................................... 385/114
See application file for complete search history.

(56) References Cited

U.S. PATENT DOCUMENTS

| | | |
|---|---|---|
| 2002/0034584 A1 | 3/2002 | Harper et al. |
| 2011/0226070 A1 | 9/2011 | Berendes et al. |
| 2014/0321799 A1 | 10/2014 | Udd |
| 2017/0292862 A1 | 10/2017 | Godfrey |
| 2024/0319464 A1 * | 9/2024 | Ota ........................... G02B 6/44 |

FOREIGN PATENT DOCUMENTS

| | | |
|---|---|---|
| CN | 109814247 A | 5/2019 |
| JP | 2000351654 A | 12/2000 |
| JP | 2018036339 A | 3/2018 |
| JP | 2018036340 A | 3/2018 |
| JP | 2019210164 A | 12/2019 |

\* cited by examiner

*Primary Examiner* — Jerry M Blevins
(74) *Attorney, Agent, or Firm* — The Roy Gross Law Firm, LLC; Roy D. Gross

(57) ABSTRACT

An optical fiber ribbon including a grating formed by a simple method is provided. The optical fiber ribbon includes a plurality of single-core coated optical fibers disposed parallel to each other, and a tape layer that covers the single-core coated optical fibers and partially connects adjacent single-core coated optical fibers. The single-core coated optical fibers include a grating part based on a plurality of strained parts formed in the tape layer at regular intervals in the longitudinal direction of the single-core coated optical fibers.

6 Claims, 5 Drawing Sheets

OPTICAL FIBER RIBBON AND METHOD FOR PRODUCING OPTICAL FIBER RIBBON

CROSS REFERENCE TO RELATED APPLICATIONS

This application is a National Phase of PCT Patent Application No. PCT/JP2023/042927 having International filing date of Nov. 30, 2023, the contents of which are all incorporated herein by reference in their entirety.

TECHNICAL FIELD

The present invention relates to an optical fiber ribbon and a method for producing the optical fiber ribbon.

BACKGROUND ART

In recent years, data traffic has increased dramatically due to the spread of Internet of Things (IoT), full-fledged 5G commercial services, autonomous driving of automobiles, and the like, and the demand is increasing for the maintenance and construction of high-speed, large-capacity optical fiber communication networks that support such data traffic. In particular, optical filters are widely used in wavelength division multiplexing (WDM) transmission, which allows more information to be transmitted in optical communication. In addition, technology that uses optical fiber gratings as optical filters has also been proposed (see Patent Literature (hereinafter, referred to as PTL) 1).

PTL 1 discloses a method for producing an optical fiber with a grating. In the method for producing an optical fiber as described in PTL 1, after a resin is attached to the coating of the optical fiber at predetermined intervals, the resin is cured. Subsequently, an optical fiber with a grating is produced by applying stress to the optical fiber at the intervals where resin is attached and fixing the bending relative to the core.

CITATION LIST

Patent Literature

PTL 1
Japanese Patent Application Laid-Open No. 2018-36340

SUMMARY OF INVENTION

Technical Problem

In the method for producing an optical fiber as described in PTL 1, a relatively large amount of resin is attached on the coating, and thus a plurality of relatively large protrusions are formed on the surface of the optical fiber. Accordingly, the number of optical fibers of PTL 1 that can be accommodated in a ready-made duct is not large, and therefore, the optical fiber of PTL 1 is not suitable for a high-speed, large-capacity optical fiber communication network. In addition, there is also a possibility that the plurality of protrusions made of resin on the coating may exert pressure on the side of other optical fibers, resulting in an adverse effect. Furthermore, the production process is complicated, and thus the production cost becomes high.

An object of the present invention is to provide an optical fiber ribbon (i.e., optical fiber tape core) with a grating formed by a simple method, and a method for producing the optical fiber ribbon.

Solution to Problem

In order to solve the above problems, one aspect of the present invention provides an optical fiber ribbon including:
  a plurality of single-core coated optical fibers disposed parallel to each other; and a tape layer that covers the plurality of single-core coated optical fibers and partially connects adjacent single-core coated optical fibers of the plurality of single-core coated optical fibers, in which
  at least one single-core coated optical fiber of the plurality of single-core coated optical fibers includes a grating part based on a plurality of strained parts formed at the tape layer at regular intervals in a longitudinal direction of the at least one single-core coated optical fiber.

Another aspect of the present invention provides a method for producing an optical fiber ribbon, the method including:
  preparing a tape-shaped core, in which the tape-shaped core includes a plurality of single-core coated optical fibers disposed parallel to each other and a tape layer that covers the plurality of single-core coated optical fibers and partially connects adjacent single-core coated optical fibers of the plurality of single-core coated optical fibers; and
  forming a grating part by forming a plurality of strained parts, in which the plurality of strained parts are formed in or at the tape layer in a longitudinal direction of the plurality of single-core coated optical fibers by dripping a solution containing a volatile liquid at regular intervals or performing cooling at regular intervals, and are formed so that a center-to-center distance of the plurality of strained parts is constant.

Advantageous Effects of Invention

The present invention is capable of providing an optical fiber ribbon including a grating part formed by a simple method and a method for producing the optical fiber ribbon.

DESCRIPTION OF EMBODIMENTS

Hereinafter, an optical fiber ribbon and a method for producing the optical fiber ribbon according to an embodiment of the present invention will be described. Herein, regarding the term "-" (or "to") indicating a numerical range, the lower limit and upper limit are included in the numerical range.

(Configuration of Optical Fiber Ribbon)

Figure 1A:
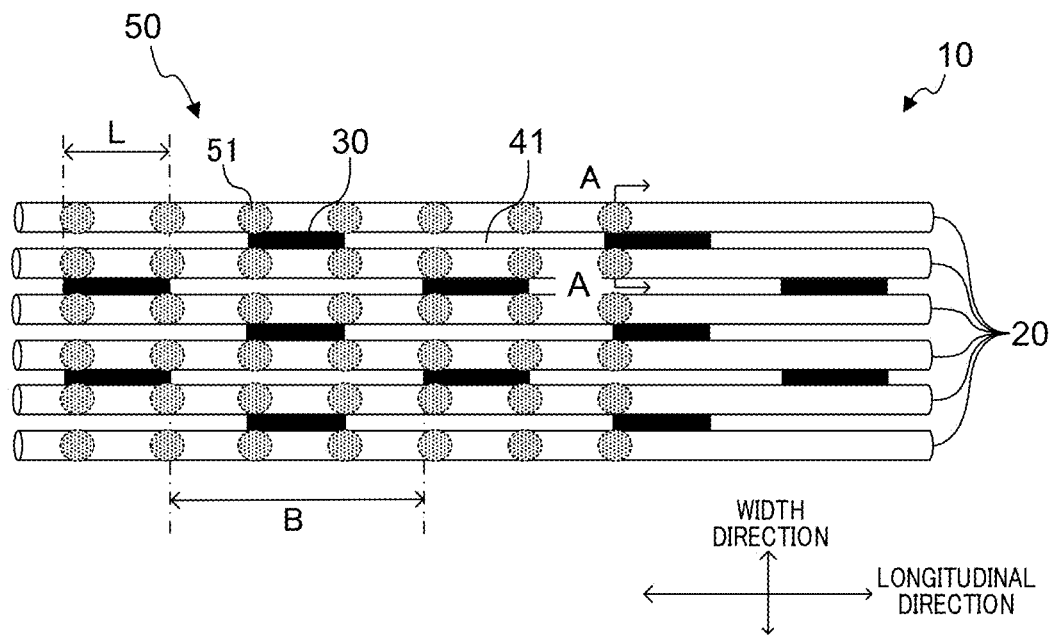
FIGS. 1A and 1B illustrate an optical fiber ribbon according to an embodiment of the present invention.
Figure 1B:
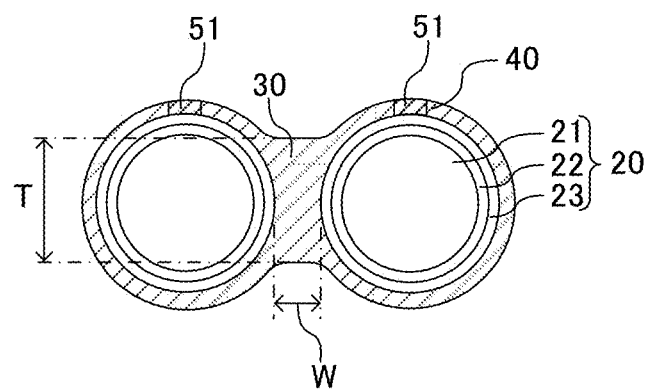

FIG. 1A is a schematic plan view of optical fiber ribbon 10. FIG. 1B is a cross-sectional view taken along line A-A in FIG. 1A.

As illustrated in FIGS. 1A and 1B, optical fiber ribbon 10 of the present embodiment includes a plurality of single-core coated optical fibers (hereinafter also simply referred to as "optical fiber(s)") 20 and tape layer 40 including a plurality of connecting part 30.

The plurality of optical fibers 20 are disposed parallel to each other. The number of optical fibers 20 is not limited as long as the number is more than one. The number of optical fibers 20 included in one optical fiber ribbon 10 is appropriately selected depending on the use of optical fiber ribbon 10. The number of optical fibers 20 in one optical fiber ribbon 10 is, for example, 2 to 12.

In the present embodiment, six optical fibers 20 are disposed parallel to each other in one optical fiber ribbon 10.

As illustrated in FIG. 1B, optical fiber 20 includes optical fiber strand 21, primary coating layer 22, and secondary coating layer 23. Optical fiber strand 21, primary coating layer 22, and secondary coating layer 23 may have the same configurations of an optical fiber strand, a first coating layer, and a second coating layer of a known optical fiber. A colored layer may be further formed on secondary coating layer 23 of optical fiber 20. It is preferable that the colored layers have different colors within optical fiber ribbon 10. This configuration allows discrimination between optical fibers 20 within one optical fiber ribbon 10. In addition, optical fiber 20 includes grating part 50.

Tape layer 40 covers optical fibers 20 and connects adjacent optical fibers 20 intermittently. In the present embodiment, a region which is located between adjacent optical fibers 20 and where tape layer 40 is disposed is referred to as connecting part 30, and a region which is located between adjacent optical fibers 20 and where tape layer 40 is not disposed is referred to as separating part 41. In optical fiber ribbon 10 of the present embodiment, connecting parts 30 and separating parts 41 are alternately disposed, in the longitudinal direction of optical fiber ribbon 10, between adjacent optical fibers 20. In the transverse direction (width direction) of optical fiber ribbon 10, it is preferable that separating parts 41 are disposed in such a way that adjacent separating parts 41 partially overlap each other.

The width W of connecting part 30 when optical fiber ribbon 10 is viewed from above (i.e., in plan view), that is, the distance between adjacent optical fibers 20 is not limited, and is, for example, within a range of more than 0 mm and less than or equal to 0.04 mm. In addition, the length L of connecting part 30 when optical fiber ribbon 10 is viewed from above is also not limited, and is, for example, within a range of 10 mm or more and 47 mm or less. Further, the thickness T of connecting part 30 is also not limited, and is, for example, within a range of 0.2 mm or more and 0.3 mm or less. When the width W, length L, and thickness T of connecting part 30 are within the above ranges, the strength of connecting part 30 is increased, and connecting part 30 is less likely to be torn even when optical fiber ribbon 10 is wound along the longitudinal direction thereof or twisted as necessary. On the other hand, the length B of separating part 41 when optical fiber ribbon 10 is viewed from above is not limited, and is, for example, within a range of 50 mm or more and 103 mm or less. When the length L of separating part 41 is within this range, it is easy to wind optical fiber ribbon 10 along the length direction thereof or twist optical fiber ribbon 10 for storing optical fiber ribbon 10 in a cable.

Grating part 50 is formed inside optical fiber 20. The position of grating part 50 in the longitudinal direction of optical fiber 20 is appropriately set depending on the intended use of optical fibers 20. In one optical fiber 20, grating part 50 may be formed at one location or at a plurality of locations. Grating part 50 is formed based on a plurality of strained parts 51 formed at regular intervals in optical fiber 20 in the longitudinal direction of optical fiber 20.

Specifically, grating part 50 is formed as stress is applied to the core of optical fiber 20 from strained parts 51 formed at a part of the outermost layer (in the present embodiment, tape layer 40) of optical fiber 20 at regular intervals. The plurality of strained part 51 are preferably formed in locations of tape layer 40 at positions directly above optical fiber 20.

"Strained part 51" refers to a portion that is strained to the extent that stress can be applied to the core of optical fiber 20, and herein, "strained part 51" is a portion having different hardness from the region (non-strained part) adjacent to this strained part 51.

The shape of strained part 51 in plan view is not limited. The shape of strained part 51 in plan view may be circular, polygonal, or any other shape. In the present embodiment, the plurality of strained parts 51 are substantially circular and have the same size.

The size of strained part 51 is such that two strained parts 51 adjacent to each other in the longitudinal direction of optical fiber 20 do not overlap. For example, the size of the strained part 51 is about 0.25 mm.

In addition, the surface of strained part 51 may be colored. In addition, in the present embodiment, the plurality of strained parts 51 are disposed only on one surface of optical fiber ribbon 10; however, the strained parts may be disposed on both surfaces of optical fiber ribbon 10. Details of the method for forming grating part 50 will be described below.

The center-to-center distance of strained parts 51 (i.e., distance between the centers of strained parts 51) in the longitudinal direction of optical fiber 20 is not limited as long as the function of a grating can be achieved. The center-to-center distance of two strained parts 51 adjacent to each other is appropriately set depending on the intended use of optical fiber 20 including grating part 50. The center-to-center distance of strained parts 51 does not necessarily have to be strictly constant. For example, when the center-to-center distance of strained parts 51 is within ±0.05 mm of the average value of the center-to-center distances, then the plurality of strained parts 51 are considered to be formed at regular intervals.

When the center of strained part 51 cannot be determined based on the shape of strained part 51 in plan view, the center of gravity of strained part 51 in plan view is used.

For example, the plurality of strained parts 51 may be disposed in such a way that the wavelength used for light incident on optical fiber 20 does not overlap the wavelength of light attenuated by grating part 50.

In such a case, the wavelength used for the light is allowed to match the optical communication band while the wavelength of the attenuated light is intentionally excluded from the optical communication band (see Examples).

Conversely, the plurality of strained parts 51 may be disposed in such a way that the wavelength used for light incident on optical fiber 20 overlaps the wavelength of light attenuated by grating part 50. In such a case, the wavelength used for the light and the wavelength of the attenuated light can be intentionally overlapped, and optical fiber 20, in which strained parts 51 are formed, can exhibit a light filtering function (see Examples). For example, when light with a plurality of wavelengths is incident on optical fiber 20 and grating part 50 is used as a wavelength filter on the output side as in WDM transmission, the strained parts 51 are formed in such a way that an unnecessary wavelength of light (the wavelength of the light to be attenuated) among the plurality of wavelengths used for light incident on optical fiber 20 becomes the wavelength of the light attenuated by grating part 50. The wavelength of the light to be attenuated can be thus blocked, and therefore the light transmitted through grating part 50 can be filtered.

The plurality of strained parts 51 may be formed for all optical fibers 20 constituting optical fiber ribbon 10 (see FIG. 1), may be formed only for one optical fiber 20, or may be formed for a some (between 1 and all) of all optical fibers 20 constituting optical fiber ribbon 10 (in the example of FIGS. 1, 2 to 5 optical fibers). The number of strained parts 51 in optical fiber 20 may be the same for different optical fibers 20 (see FIG. 1), or may be different for different optical fibers 20.

(Method for Producing Optical Fiber Ribbon)

Figure 2:
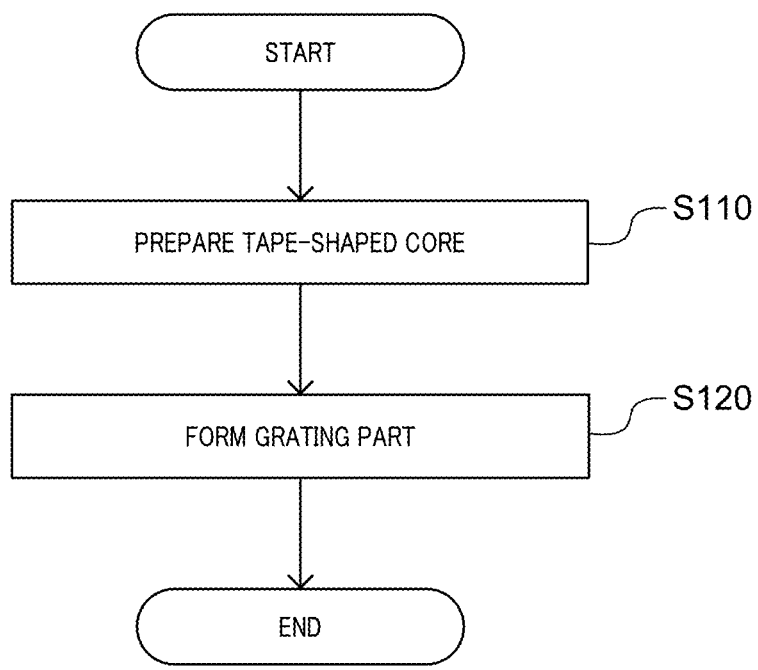
FIG. 2 is a flowchart for describing a method for producing an optical fiber ribbon.
Figure 3:
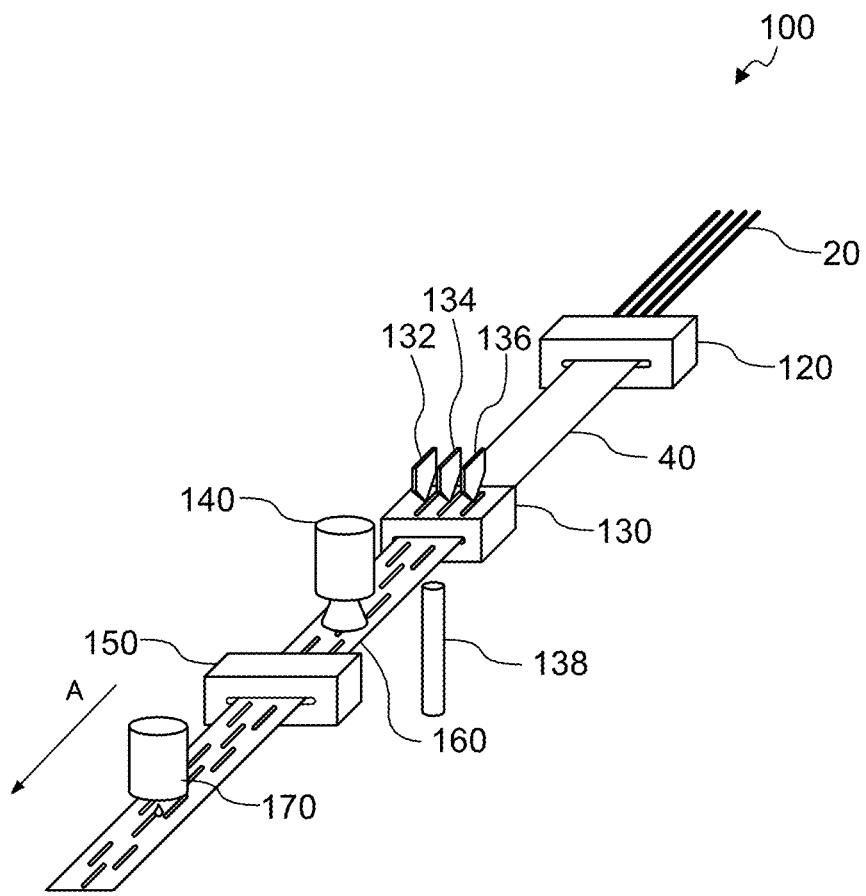
FIG. 3 is a perspective view illustrating an exemplary apparatus for producing an optical fiber ribbon.

In the following, a method for producing optical fiber ribbon 10 will be described. FIG. 2 is a flowchart for describing a method for producing optical fiber ribbon 10. FIG. 3 is a perspective view illustrating an example of production apparatus 100, namely an apparatus for producing optical fiber ribbon 10.

Here, a method for forming grating part 50 based on strained parts 51 that are formed by dripping a solution containing a volatile liquid at regular intervals will be described as an example.

As illustrated in FIG. 2, the method for producing optical fiber ribbon 10 according to the present embodiment includes a step of preparing tape-shaped core 160 (S110) and a step of forming grating part 50 (S120).

In the step of preparing tape-shaped core 160 (S110), tape-shaped core 160 including the above-described optical fibers 20 is prepared. Tape-shaped core 160 may be produced by any method. For example, tape-shaped core 160 may be prepared using production apparatus 100 illustrated in FIG. 3.

Specifically, while the plurality of optical fibers 20 are conveyed in conveyance direction A, an uncured photocurable resin is applied so as to have the shape of a tape to the plurality of optical fibers 20 by using tape die 120, thereby forming tape layer 40. Subsequently, separation needles 132, 134, and 136 of separation die 130 are moved up and down with respect to tape layer 40 to remove portions of tape layer 40, thereby forming the above-described separating parts 41 (and connecting parts 30). At the same time, resin suction device 138 sucks excess photocurable resin resulted from the descent of separation needles 132, 134, and 136 blocking the photocurable resin.

Tape layer 40 is then irradiated with light by light irradiation device 140 to semi-cure the uncured photocurable resin, and finally, the tape layer is further irradiated with light irradiation device 150 to completely cure the semi-cured photocurable resin. The cumulative irradiation amounts of the upstream light irradiation device 140 and the downstream light irradiation device 150 are adjusted in such a way that the upstream light irradiation device 140 has a smaller cumulative irradiation amount and the downstream light irradiation device 150 has a larger cumulative irradiation amount.

In the step of forming a grating part (S120), tape-shaped core 160 produced in the step of preparing tape-shaped core 160 (S110) is further conveyed in the length direction (direction indicated by A in FIG. 3) by the above-described production apparatus 100, as illustrated in FIG. 3, for example. In a predetermined region of optical fiber 20, the outermost layer of optical fiber 20 is partially cooled in the longitudinal direction of optical fiber 20. Any method may be used for partially cooling the outermost layer of optical fiber 20.

Examples of methods for partially cooling the outermost layer of optical fiber 20 include a method in which a solution containing a volatile liquid is dripped at regular intervals, and a method in which cooling is performed at regular intervals by using a predetermined means. In the present embodiment, a solution containing a volatile liquid is dripped from strain forming device 170 at regular intervals. The volatile liquid of the dripped solution is then vaporized. Strain forming device 170 is, for example, an inkjet type droplet ejecting device. Examples of the volatile liquid include methyl ethyl ketone and ethanol. In addition, the solution containing a volatile liquid may also contain at least one of dyes, pigments, and the like. At this time, the outermost layer of optical fiber 20 is cooled and shrunk (distorted) due to the heat of vaporization generated when the volatile liquid vaporizes. At this time, the temperature of the outermost layer of optical fiber 20 is, for example, 37.3° C. or higher, preferably 50° C. or higher, and the lower limit value may be adjusted depending on the type of volatile liquid. As a result, strained parts 51 are formed in optical fiber 20. In this manner, based on strained parts 51 formed at optical fiber 20, stress is applied to the core of optical fiber 20, thereby forming grating part 50.

For performing cooling at regular intervals, a device that partially cools optical fiber 20 is used as the strain forming device. In this case, the outermost layer of optical fiber 20 is cooled and shrunk (distorted). As a result, based on strained parts 51 formed in optical fiber 20, stress is applied to the core of optical fiber 20, thereby forming grating part 50. The device that partially cools optical fiber 20 may partially cool optical fiber 20 with, for example, liquid nitrogen.

In addition, in the step of forming a grating part, grating part 50 based on strained parts 51 may be formed so that the wavelength used for light incident on optical fiber 20 does not overlap the wavelength of light attenuated by grating part 50 by dripping a solution containing a volatile liquid or by performing the cooling.

The above description indicates a case such that the device used in the step of preparing the tape-shaped core (S110) and the device used in the step of forming the grating part (S120) are in one device as an example; however, these devices may be disposed on separate lines.

(Effect)

As described above, the present invention can obtain optical fiber ribbon 10 including grating part 50 formed by a simple method as grating part 50 is formed from strained part 51 obtained by partially cooling optical fiber 20.

EXAMPLES

Hereinafter, the present invention will be described in more detail with reference to Examples. However, the scope of the present invention is not limited in any way by these Examples, and the embodiments can be modified without departing from the spirit of the present invention.

(1) Preparation of Sample

Single-core coated optical fibers with an outer diameter of 250 μm were prepared. In each single-core coated optical fiber, a primary coating composed of a urethane acrylate photocurable resin and a secondary coating composed of a urethane acrylate photocurable resin are applied on a quartz glass SM optical fiber with an outer diameter of 125 μm. Subsequently, 12 single-core coated optical fibers were arranged, a urethane acrylate photocurable resin was applied to form a tape layer, and connecting parts and separating parts were formed, thereby obtaining a tape-shaped core.

A solution containing a volatile liquid is then dripped onto the 12 optical fibers in the tape-shaped core at predetermined intervals so that a droplet of the solution overlapped two or more of the optical fibers, and cooling was performed by drying. A grating part based on a plurality of strained parts was thus formed to obtain an optical fiber ribbon. The strained part has a shape of substantially circular, and a size of approximately 0.25 mm.

(2) Measurement of Optical Transmission Loss at Wavelength of 1,310 nm

Optical transmission loss at a wavelength of 1,310 nm was measured. Approximately 3,000 m of the produced optical fiber ribbon was prepared and wound around a bobbin (assuming that the optical fiber ribbon is stored or implemented at high density). In this state, the transmission loss of light at a wavelength of 1,310 nm was measured for each optical fiber in accordance with IEC60793-1-40.

Figure 4:
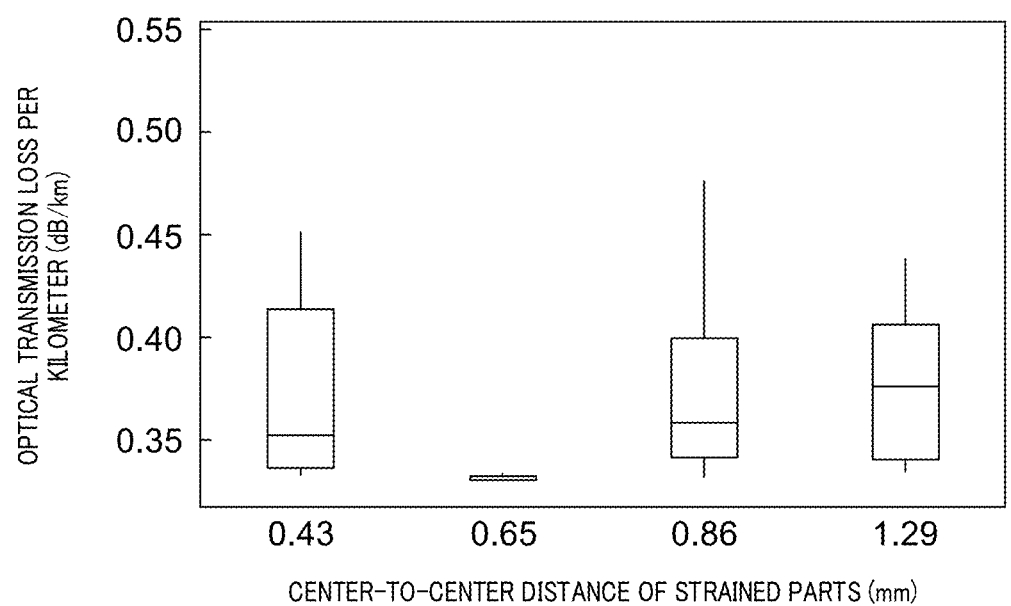
FIG. 4 is a graph showing the relationship between the center-to-center distance of strained parts (i.e., distance between the centers of the strained parts) and optical transmission loss.

FIG. 4 shows the relationship between the center-to-center distance of the strained parts and the optical transmission loss. FIG. 4 is a graph showing the relationship between the center-to-center distance of strained parts and optical transmission loss. In FIG. 4, the horizontal axis indicates the center-to-center distance (mm) of the strained parts, and the vertical axis indicates the optical transmission loss per kilometer (dB/km). The center-to-center distance of the strained parts was set to 0.43 mm, 0.65 mm, 0.86 mm, or 1.29 mm (the minimum value of the center-to-center distance of was set to 0.43 mm because 0.43 mm was the lower limit in manufacturing by the strain forming device, and the other center-to-center distances were set at 1.5 times, 2 times, and 3 times the minimum value).

As shown in FIG. 4, when the center-to-center distance of the strained parts is 0.65 mm, the optical transmission loss of light with a wavelength of 1,310 nm can be reduced.

FIG. 4 shows that dripping a solution containing a volatile liquid at predetermined intervals and cooling the dripped solution can form a grating part based on a plurality of strained parts.

Figure 5:
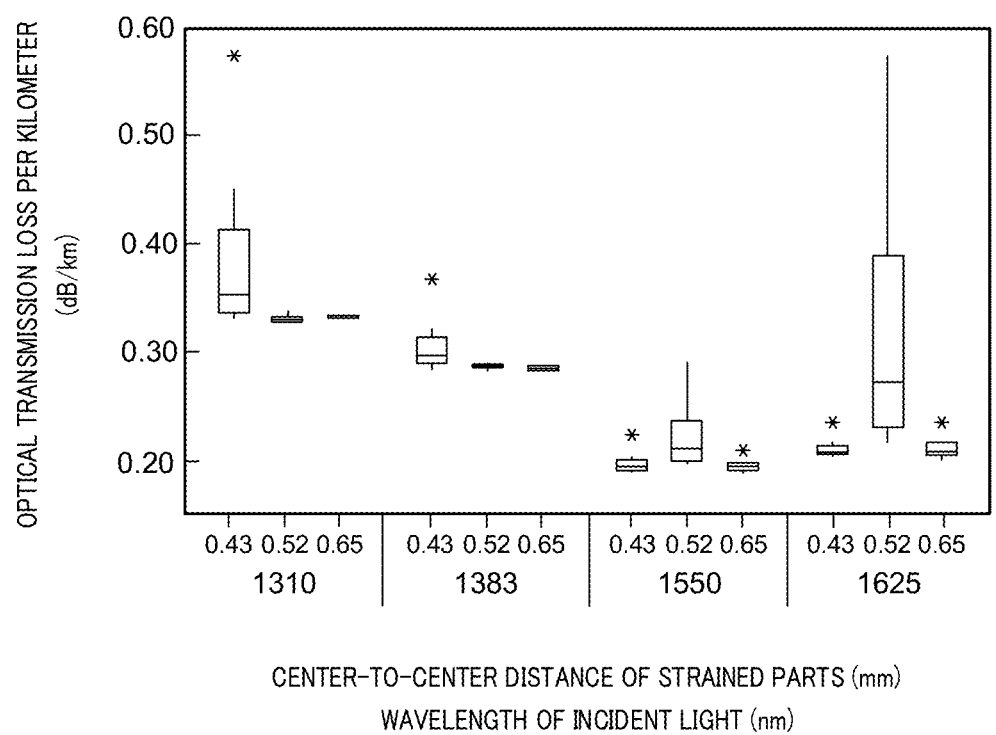
FIG. 5 is a graph showing the relationship between the center-to-center distance of strained parts, the wavelength of light incident on the optical fiber ribbon, and optical transmission loss.

The relationship between the center-to-center distance of strained parts, the wavelength of light incident on the optical fiber ribbon, and optical transmission loss was investigated. FIG. 5 shows the relationship between the center-to-center distance of strained parts of the optical fiber ribbon 24 hours after the production thereof, the wavelength of light incident on the optical fiber ribbon, and the optical transmission loss per kilometer. In FIG. 5, the upper row of the horizontal axis indicates the center-to-center distance (mm) of the strained parts, the lower row of the horizontal axis indicates the wavelength (nm) of the light incident on the optical fiber ribbon, and the vertical axis indicates the optical transmission loss (dB/km) per kilometer. The attenuation wavelength was measured with an optical time domain reflectometer (OTDR).

In the case of the incident light having short wavelengths (1,310 nm, 1,383 nm), FIG. 5 shows the following: when the center-to-center distance of strained parts was 0.52 mm or more, the optical transmission loss was small; and on the other hand, when the center-to-center distance of strained parts was 0.43 mm, the optical transmission loss was large. In addition, in the case of the incident light having long wavelengths (1,550 nm, 1,625 nm), FIG. 5 shows the following: when the center-to-center distance of strained parts was 0.65 mm or more and less than 0.43 mm, the optical transmission loss was small; and on the other hand, when the center-to-center distance of strained parts was 0.52 mm, the optical transmission loss was large.

In this manner, it can be seen that the attenuation wavelength can be adjusted by controlling the center-to-center distance of strained parts.

INDUSTRIAL APPLICABILITY

The optical fiber ribbons obtained by the present invention are particularly advantageous, for example, for optical fibers used in high-speed, large-capacity optical fiber communication networks.

REFERENCE SIGNS LIST

10 Optical fiber ribbon
20 Single-core coated optical fiber
21 Optical fiber strand
22 Primary coating layer
23 Secondary coating layer
30 Connecting part
40 Tape layer
41 Separating part
50 Grating part
51 Strained part
100 Production apparatus
120 Tape die
130 Separation die
132, 134, 136 Separation needle
138 Resin suction device
140 (Upstream) light irradiation device
150 (Downstream) light irradiation device
160 Tape-shaped core
170 Strain forming device

The invention claimed is:

1. A method for producing an optical fiber ribbon, the method comprising:
    preparing a ribbon-shaped core, wherein the ribbon-shaped core includes a plurality of single-core coated optical fibers disposed parallel to each other and a tape layer that covers the plurality of single-core coated optical fibers and partially connects adjacent single-core coated optical fibers of the plurality of single-core coated optical fibers; and
    forming a grating part by forming a plurality of strained parts, wherein the plurality of strained parts are formed in the tape layer in a longitudinal direction of the plurality of single-core coated optical fibers by dripping a solution containing a volatile liquid at regular intervals or performing cooling at regular intervals, and are formed so that a center-to-center distance of the plurality of strained parts is constant.

2. The method according to claim 1, wherein
    in the forming the grating part, the solution containing the volatile liquid is dripped or the cooling is performed so that a wavelength used for light incident on the plurality of single-core coated optical fibers does not overlap a wavelength of light attenuated by the grating part.

3. The method according to claim 2, wherein
    at least one of the plurality of strained parts is formed to overlap two or more of the plurality of single-core coated optical fibers.

4. The method according to claim 1, wherein
in the forming the grating part, the solution containing the volatile liquid is dripped or the cooling is performed so that a wavelength used for light incident on the plurality of single-core coated optical fibers overlaps a wavelength of light attenuated by the grating part.

5. The method according to claim 4, wherein
at least one of the plurality of strained parts is formed to overlap two or more of the plurality of single-core coated optical fibers.

6. The method according to claim 1, wherein
at least one of the plurality of strained parts is formed to overlap two or more of the plurality of single-core coated optical fibers.

* * * * *